Nov. 18, 1941.　　　　E. L. ROSE　　　　2,263,314
POWER TRANSMISSION
Original Filed Oct. 17, 1936
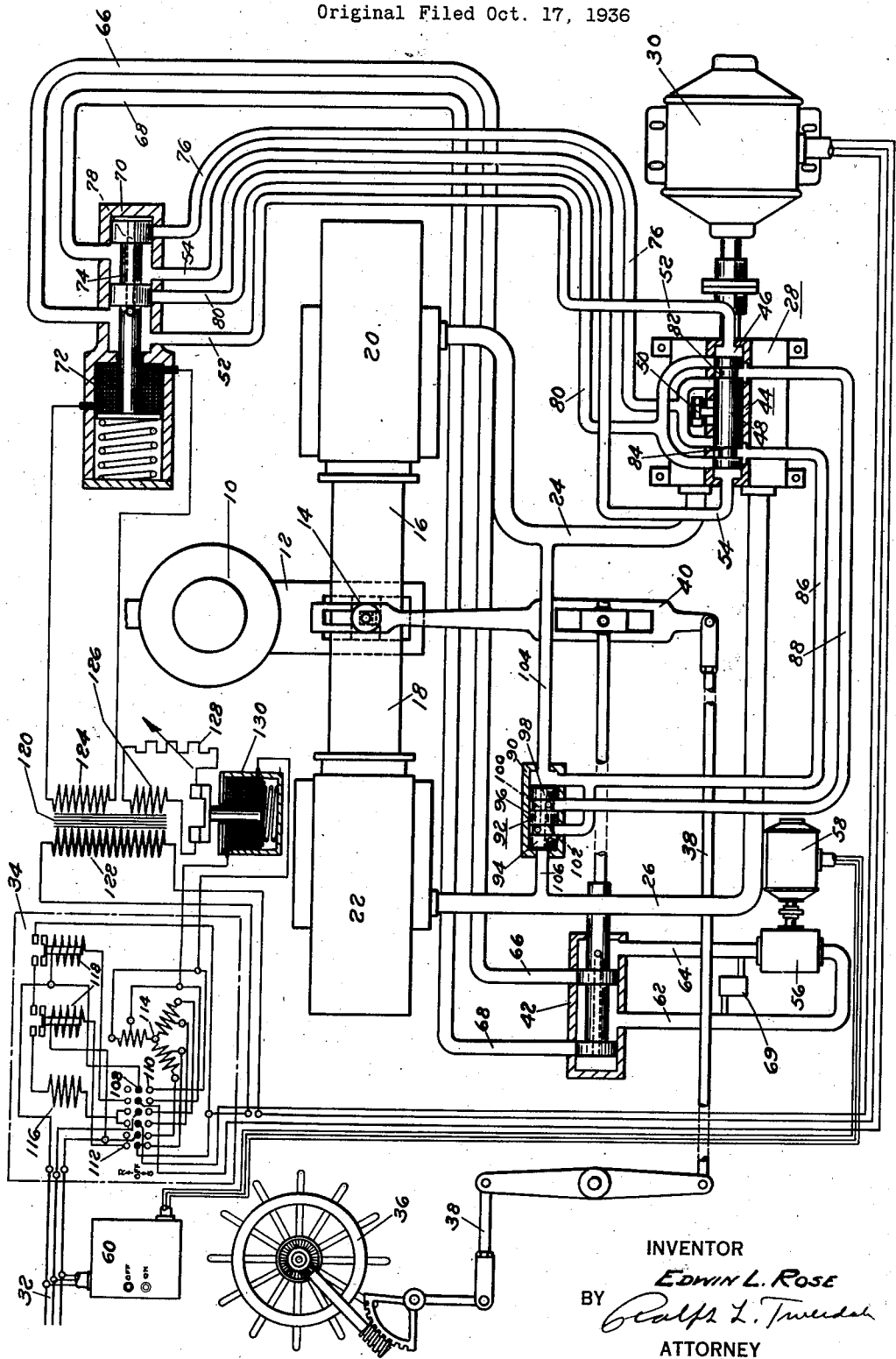
INVENTOR
*Edwin L. Rose*
BY
*Ralph L. Tweedale*
ATTORNEY Patented Nov. 18, 1941

2,263,314

UNITED STATES PATENT OFFICE 2,263,314

POWER TRANSMISSION

Edwin L. Rose, Watertown, Conn., assignor to The Waterbury Tool Company, Waterbury, Conn., a corporation of Connecticut Application October 17, 1936, Serial No. 106,145
Renewed February 28, 1938

9 Claims. (Cl. 103—38)

This invention relates to power transmissions and more particularly to those of the type wherein a variable displacement pump is operated by a prime mover to supply fluid to a fluid motor which operates a load device. Power transmissions of this character present many advantages for uses where it is necessary to operate a load device at variable speeds from a constant speed prime mover. For example, a transmission of this character may be used as a steering engine for turning the rudder of the ship, suitable control means being provided for varying the displacement of the pump in the proper direction and by the proper amount to operate the rudder moving motor in correspondence to the movements imparted to the ship's steering wheel. In this and many other applications wherein the resisting load which the fluid motors must overcome is widely variable and beyond control, it is desirable to prevent the transmission of excessive resisting force back to the prime mover through the power transmission which would cause overloading of the prime mover.

In a ship's steering gear the rudder is subject to widely fluctuating forces tending to move it from side to side particularly when moving astern or when rolling in heavy seas. The nature and magnitude of these forces it is of course impossible to control, if the rudder is to be maintained immovable while the forces act on it. The forces acting on the rudder are transmitted to a fluid motor which operates the rudder and through the connecting conduits to the steering gear pump. If the pump is at zero displacement, no force is transmitted by the rudder to the prime mover because the mechanical advantage of the pump over the motor is infinite. Should the pump happen to be adjusted at full displacement, however, when a sudden wave impact is applied to the rudder, in opposition to its intended direction of movement, the resisting torque, which must be overcome by the prime mover driving the pump, may be several times the torque required to move the rudder at full speed in still water.

In order to avoid the necessity of using a prime mover of sufficient capacity to handle this abnormal torque, resort has been made to various expedients for preventing the transmission of excessive torque to the prime mover shaft. Among them are the so-called torque equalizer which operates in response to the development of a predetermined pressure in the fluid transmission system either to by-pass the two sides of the system or to reduce the pump displacement to zero or to an arbitrary low value while the pressure remains above the predetermined overload point. None of the prior arrangements have been wholly satisfactory since they do not permit the utilization of the full torque capacity of the prime mover when it is desired to operate the rudder at less than full speed. In order to hold the prime mover torque to a safe value when the rudder is to be moved at full speed, the pressure at which the torque equalizer operates must be far below the safe pressure for rudder operation at a fraction of full speed. As a result such devices, when the rudder meets a resistance which is too great for full speed operation, operate, in effect, to stop all rudder movement or, at best, to let the rudder slowly creep ahead until the resistance falls to the point where it may be overcome at full speed regardless of whether or not full speed movement is called for at the moment.

It is also desirable in power transmissions of this character to insure that, when the system has been shut down and the prime mover stopped, the system may be again started under no load so that the use of a relatively inexpensive low starting torque motor is permitted.

According to the present invention the problems recited are overcome by providing mechanism which operates to always maintain the mechanical power transmitted by the fluid transmission below a predetermined value, which of course must be within the maximum safe output capacity of the prime mover. For this purpose the invention contemplates the provision of means operable in response to the current drawn by an electric motor prime mover to increase the mechanical advantage of the fluid pump over the fluid motor whenever the current drawn by the electric motor exceeds a predetermined value; but effective to permit the full power of the motor to be used against whatever resistance happens to be encountered at any instant. The same mechanism may be also utilized to prevent overload in starting the electric motor by adjusting the current responsive means so that it acts to increase the mechanical advantage of the pump at a lower current value than that at which it acts during normal running. This adjustment is preferably made automatically whenever the motor starting compensator is operated to start the motor and is restored to normal adjustment as soon as the starting compensator moves to normal running position.

Among the objects of the present invention, therefore, are the provision of a fluid power transmission system in which the difficulties enumerated are avoided by the use of current responsive means for increasing the mechanical advantage of the prime mover over the resisting load and to provide for altering the response of this means to operate on lower current values during the starting period of the prime mover.

A further object is to provide a variable displacement fluid pressure energy translating device wherein a fluid motor operates to vary the displacement thereof and has directly associated therewith a valve operable to reverse the connections to such a fluid motor as the motor passes through zero displacement position.

Further objects and advantages of the present invention will be apparent from the following description, reference being had to the accompanying drawing wherein a preferred form of the present invention is clearly shown.

Referring now to the drawing wherein is diagrammatically represented a ship's steering gear employing a fluid power transmission driven by an electric motor for operating the rudder under follow-up control from a steering wheel, the rudder stock is indicated at 10 and carries a tiller arm 12 which is connected by a cross head and pivot at 14 to a double acting pair of rams 16 and 18. The rams 16 and 18 are reciprocable in hydraulic cylinders 20 and 22, respectively, which are connected by main circuit conduits 24 and 26 to the suction and delivery ports of a reversible variable displacement pump 28. The pump 28 may be of any construction such as the well-known "Waterbury" type which includes a tilting box which may be variably tilted to either side of a neutral position for varying both the direction and amount of fluid delivery. The pump 28 is operated by an electric motor prime mover 30 which is illustrated as a three-phase induction motor connected to a supply line 32 through a suitable starting compensator 34.

Normal control of the displacement of the pump is accomplished from the ship's steering wheel 36 by suitable motion transmitting mechanism indicated generally at 38. The linkage 38 connects to one end of a floating lever 40, which is connected at its opposite end to the cross head 14 and intermediate its ends to a follow-up valve 42. The latter controls a tilting box operating fluid motor 44 which comprises a double acting cylinder 46 within which is freely reciprocable a piston 48 connected by a suitable linkage indicated at 50 to the tilting box or other displacement regulating means of the pump 28. The position of the piston 48 is controlled by the admission and exhaust of fluid to the piston 48 through conduits 52 and 54. Fluid under pressure for this purpose is supplied from an auxiliary pump 56 operated by an auxiliary motor 58 connected to the line 32 through the usual starting box 60.

The pump 56 is connected by a pressure conduit 62 and a return conduit 64 with follow-up valve 42 which connects with a pair of conduits 66 and 68, the normal position of the follow-up valve 42 being as illustrated in the drawing with the conduits 66 and 68 blocked. A suitable pressure relief valve 69 is connected across the lines 62 and 64 to limit the maximum pressure in line 62. The conduits 66 and 68 lead to a solenoid operated six-way reverse valve 70 which in normal position, as shown, connects conduits 66 and 68 with the conduits 52 and 54, respectively. When the solenoid 72 of the valve 70 is energized, the valve piston 74 moves to the left connecting the conduit 52 to a conduit 76 through a passage 78 in the piston 74 and connecting the conduit 54 to a conduit 80. Cylinder 46 and piston 48 are formed to provide a pair of three-way valves 82 and 84 for controlling communication between the conduits 76 and 80 on the one hand and a pair of conduits 86 and 88 on the other hand.

The construction of the valves 82 and 84, which may be considered as a six-way reverse valve, is such that when the piston 48 is in neutral or zero displacement position the conduits 86 and 88 are blocked off from the conduits 76 and 80. When the piston 48 moves to the left of neutral position, conduit 86 is connected with conduit 80 while conduit 88 is connected with conduit 76. When the piston 48 is moved to the right of neutral, conduit 86 is connected with conduit 76 while conduit 88 is connected with conduit 80. The construction is preferably such that the connections change through a rather small range of movement near neutral position and are maintained throughout the full movement of the piston 48 on either side of this narrow range. Conduits 86 and 88 are connected to a shuttle valve 90 having a piston 92 with three heads 94, 96 and 98. The space between the piston heads 94 and 96 connects by a passage 100 to the space beyond the head 98 while the space between the heads 96 and 98 connects by a passage 102 with the space beyond the head 94. The opposite ends of the valve 90 are connected by conduits 104 and 106 with the main circuit conduits 24 and 26, respectively.

The starting compensator 34 may be of any suitable construction and is illustrated, by way of example, as having a series of contacts 108 movable to engage a series of fixed contacts 110 for starting the motor and to engage a series of fixed contacts 112 for normal running. During the starting period the motor 30 is connected to the line 32 through an autotransformer 114 while during the running period the motor is directly across the line 32. The usual no-voltage release 116 and overload trip relays 118 may be provided for motor protection.

A current transformer 120 has a primary winding 122 in series with one leg of the line between the motor 30 and the starting compensator 34. The transformer 120 has a main secondary winding 124 which is connected in series with the solenoid 72. An auxiliary secondary winding 126 is also provided which may be shunted through a variable resistance 128 by a relay 130 which is closed when not energized. The winding of the relay 130 is connected in parallel with one of the autotransformer secondary sections to be energized during the starting period of the motor 30.

In operation, assuming the motor 30 and pump 28 to be at rest and assuming also that before stopping, the piston 48 happened to be moved fully to the left of neutral, the starting compensator 34 will be operated to connect the movable contacts 108 with the fixed contacts 110, throwing the motor 30 on the line 32 through the autotransformer 114. The motor 30 and the pump 28 will thus start to rotate and the solenoid 130 will also be energized opening the shunt circuit around the secondary winding 126. The pump 28 being in full displacement adjustment, fluid will be pumped into the main circuit conduit 26 to the cylinder 22 and will be withdrawn from the cylinder 20 through the main circuit conduit 24. The resistance to movement of the rudder through the water builds up pressure in the conduit 26 and creates a resisting torque on the shaft of the motor 30 which will cause a predetermined current to be drawn by the motor. The solenoid 72 is accordingly energized by the secondary winding 124 of the current transformer 120, moving the valve 74 to the left and connecting the conduits 52 and 54 with the conduits 76 and 80, respectively. Inasmuch as the piston 48 is to the left of neutral position, the conduit 86 is connected to the conduit 80 and the conduit 88 is connected to the conduit 76.

The pressure existing in conduit 26 causes the shuttle valve piston 92 to move to the right admitting pressure fluid through conduit 106 to the conduit 86 and exhausting fluid from the conduit 88 through passage 100 to the conduit 104 and main circuit conduit 24. The piston 48 is thus moved to the right by pressure fluid delivered by the pump 28 through conduits 26, 106, 86, 80, and 54. Fluid exhausts from the right-hand end of cylinder 46 through conduits 52, 74, 76, 88, 100, 104 and 24 to the pump 28. Thus any pressure built up to resist the free starting of the pump 28 acts to decrease its displacement until neutral position is reached when the valves 82 and 84 block off the conduits 86 and 88 from further communication with the conduits 76 and 80.

With the pump at or near neutral position the load on the motor 30 is small regardless of pressure in the conduit 26 and the motor 30 continues to increase in speed until normal running speed is reached at which time the starting compensator 34 is automatically or manually thrown to running position. The auto-transformer 114 is thereby cut out of the circuit and solenoid 130 is deenergized thus completing the shunt circuit around the secondary winding 126. The shunting of the winding 126 absorbs a portion of the flux created by the winding 122 in the transformer core and thus requires a higher current value in the winding 122 to energize the solenoid 72. With the motor 30 operating at no load, due to the pump 28 having been adjusted at zero displacement, the solenoid valve 74 will move to the right as soon as the starting compensator 34 moves to running position. The motor 44 is thus connected through valve 70 to the follow-up valve 42. The current value at which solenoid 72 operates during running may be adjusted by varying the resistance 128.

At any time either before or after starting the motor 30, the auxiliary motor 58 may be started by the starting box 60, placing the auxiliary pump 56 in operation. With both pumps 28 and 56 operating, the rudder position may be controlled by the wheel 36 through the linkage 38, the floating lever 40, the follow-up valve 42, and the fluid motor 44 in the usual manner. If it is attempted to move the rudder at full speed against excessive resistance caused by the ship's moving astern or by a wave or a roll of the ship in heavy seas, so that the motor 30 would otherwise be overloaded, the increased current flowing through the winding 122 causes energization of the solenoid 72 to operate the valve 70 and reduce the displacement of the pump in the same manner described previously in connection with the operation during starting.

It will be noted that the action is reversed if the piston 48 happens to be on the right side of neutral position either during a starting overload or during a running overload. Thus when the valve 70 is moved to the left with the piston 48 lying to the right of neutral position, pressure fluid flows from the conduit 86 through conduits 76, 74, and 52 to the right-hand end of the cylinder 46 while fluid is exhausted from the left-hand end of the cylinder 46 through conduits 54, 80, 88, 100 and 104. The conduit 86 is always connected to whichever of the lines 24 or 26 is under a higher pressure than the other while the conduit 88 is likewise always connected to the one of lower pressure. This result is achieved by the automatic operation of the shuttle valve piston 92 which moves to the right whenever conduit 26 is under the higher pressure and moves to left whenever the conduit 24 is under the higher pressure.

It is thus apparent that the present invention provides a fluid power transmission system in which the power requirements at the motor 30 are always maintained below a predetermined safe maximum and in which it is impossible to apply an excessive torque to the motor 30 during the starting period.

While the form of embodiment of the invention as herein disclosed, constitutes a preferred form, it is to be understood that other forms might be adopted, all coming within the scope of the claims which follow.

What is claimed is as follows:

1. In a fluid power transmission system including a variable displacement pump, an electric motor for driving said pump, means normally controlling the displacement of the pump, means responsive to the rise in current drawn by the electric motor beyond a predetermined value for decreasing the pump displacement to limit the power delivered by the system to a predetermined maximum, and means operative during the starting of the electric motor for causing the last named means to operate in response to a current above a different predetermined value.

2. In a fluid power transmission system including a variable displacement pump, an electric motor for driving said pump, means normally controlling the displacement of the pump, a current transformer in series with the motor, means controlled thereby for decreasing the pump displacement whenever the current drawn by the motor exceeds a predetermined value, and means rendered effective during starting of the electric motor to vary the effect of said current transformer whereby the pump displacement is decreased at a lower current value during starting than during running.

3. In a fluid power transmission system including a variable displacement pump, an electric motor for driving said pump, means including a fluid motor and a control valve therefor for normally controlling the displacement of the pump, a current transformer in series with the motor, a valve operated from said current transformer for operating said fluid motor independently of the control valve to decrease the pump displacement and means rendered effective during starting of the electric motor to vary the effect of said current transformer whereby the pump displacement is decreased at a lower current value during starting than during running.

4. In a fluid power transmission system including a variable displacement pump, an electric motor for driving said pump, means normally controlling the displacement of the pump, a current transformer in series with the motor, means controlled thereby for decreasing the pump displacement whenever the current drawn by the motor exceeds a predetermined value, and means for shunting a portion of the transformer winding during the motor starting period whereby the pump displacement is decreased at a lower current value during starting than during running.

5. In a fluid power transmission system including a variable displacement pump, an electric motor for driving said pump, means normally controlling the displacement of the pump, a current transformer in series with the motor, means controlled thereby for decreasing the pump displacement whenever the current drawn by the motor exceeds a predetermined value, means for shunting a portion of the transformer winding during the motor starting period whereby the pump displacement is decreased at a lower current value during starting than during running, and means for varying the resistance of the shunt.

6. In a fluid power transmission system including a variable displacement pump, a motor for driving said pump, means including a fluid motor and a control valve therefor for normally controlling the displacement of the pump, a valve operable to render the first valve ineffective on said fluid motor and to admit operating fluid directly to the fluid motor, and a valve directly connected to the fluid motor for reversing the direction of fluid flow to the fluid motor as the displacement controlling means passes through zero displacement position.

7. In a variable displacement fluid pressure energy translating device the combination with a plurality of expansible chamber elements, means for operating said elements and means for varying the displacement of said elements, of a fluid motor comprising a cylinder, a piston in said cylinder, means connecting the motor to operate the displacement varying means, control means for the motor and valve means formed in said piston and cylinder, and operable to reverse the connections of said motor with its control means as the motor passes through zero displacement position.

8. In a variable displacement fluid pressure energy translating device the combination with a plurality of expansible chamber elements, means for operating said elements and means for varying the displacement of said elements, of a fluid motor comprising a cylinder, a piston in said cylinder, means connecting the motor to operate the displacement varying means, control means for the motor and valve means directly connected to said motor and operable to reverse the connections of said motor with its control means as the motor passes through zero displacement position.

9. In a fluid power transmission system for driving a load operable at variable speed and imposing varying load renistance at any speed and having a hydraulic variable speed transmission including a variable displacement pump and fluid motor connected to drive the load device, the combination of an electric motor connected to drive the pump and of insufficient power capacity to drive the pump at maximum designed displacement and pressure, a member shiftable to adjust the displacement of the pump, means for shifting said member to any desired displacement position and exercising sole control over the pump displacement under all operating conditions within the power capacity of the electric motor, additional control means for shifting said member to decrease the pump displacement independently of the first control means, and means including an electrically operated device responsive to the current passing through the electric motor for initiating operation of said additional control means only when the pressure is sufficiently high to overload the motor at the then existing pump displacement.

EDWIN L. ROSE.